(12) United States Patent
Debras

(10) Patent No.: US 6,495,114 B1
(45) Date of Patent: *Dec. 17, 2002

(54) PRODUCTION OF SILICA PARTICLES

(75) Inventor: Guy Debras, Frasnes-lez-Gosselies (BE)

(73) Assignee: Fina Research, S.A., Feluy (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/460,472

(22) Filed: Dec. 14, 1999

(51) Int. Cl.$^7$ ............................................... C01B 33/12
(52) U.S. Cl. ...................................................... 423/337
(58) Field of Search .......................................... 423/337

(56) References Cited

U.S. PATENT DOCUMENTS

| | | | |
|---|---|---|---|
| 3,899,573 A | * | 8/1975 | Shaw et al. .................. 423/337 |
| 5,405,445 A | * | 4/1995 | Kumada et al. ............. 118/719 |

FOREIGN PATENT DOCUMENTS

| | | |
|---|---|---|
| FR | 2015583 A | 4/1970 |
| FR | 2039121 A | 1/1971 |
| FR | 2243153 A | 4/1975 |
| GB | 1145290 A | 3/1969 |
| JP | 52295 | 3/1989 |
| JP | 02232309 A | 3/1989 |
| JP | 01306510 A | 12/1989 |
| JP | 07017707 A | 1/1995 |

OTHER PUBLICATIONS

Balabanova E G et al: "Model predictions for the characteristics of plasma–produced ultrafine silica powders" High Tempatures –High Pressures, 1997, Pion, UK, vol. 29, No. 6, pp. 711–716, XP000856965 ISSN: 0018-1544' pp. 711–712, 713, 714, 715, 716 no month.

Chemical Abstracts, vol. 83, No. 22, Dec. 1, 1975 (12–01–1975), Columbus, Ohio, US; abstract No. 183998, Videnov N. B. et al.: "Production of highly dispersed silicon dioxide in a plasma jet" XP002126122 *abstract* & Khim. Ind., vol. 47, No. 6, 1975, pp. 243–245.

Manabu Kato et al.: "Synthesis of coesite from ultra fine particles" Japanese Journal of Applied Physics., vol. 14, No. 2, Feb. 1975 (02–1975), pp. 181–183 pages 181, 182 "2 Starting Materials".

P. K. Mishra et al.: "Fine Silica Power Preparation by Use of a Transferred Art Thermal Plasma Reactor" Materials Letters, vol. 23, No. 1,2,3, 1995, pp. 153–156, North Holland Publishing Company Amsterdam, NL ISSN: 0167–577X *the whole document*.

* cited by examiner

*Primary Examiner*—Steven P. Griffin
*Assistant Examiner*—Edward M. Johnson
(74) *Attorney, Agent, or Firm*—Gilbreth & Associates

(57) ABSTRACT

A process for producing ultra fine silica particles, the process comprising directing a plasma jet onto a silicon-containing compound thereby to form silica vapor and condensing the silica vapor on a collection surface.

9 Claims, 5 Drawing Sheets

PRODUCTION OF SILICA PARTICLES

The present invention relates to a process for producing ultra fine silica particles of sub micron size, i.e. silica particles having an average diameter of less than 1 micron. Such particles are sometimes referred to in the art as "colloidal" silica particles.

Ultra fine sub micron silica particles are known in the art. For example, a fine silica particle material wherein the silica particles are spherical particles having an average diameter between 7 and 40 nanometers and produced by the hydrolysis of a volatile silane compound in an oxygen-hydrogen gas flame is available in commerce under the trade name AEROSIL from the company Degussa AG of Frankfurt Am Main, Germany. In addition, the production of fine silica particles is disclosed in "The Chemistry of Silica", by Ralph Kisla, 1979, John Wiley & Sons, Inc. That document discloses on page 25 three ways for producing anhydrous amorphous silica particles at high temperature, these being vaporising silicon dioxide in an arc or plasma jet and condensing it in a stream of dry inert gas; oxidising silicon monoxide in the vapour phase with air and condensing the silicon dioxide; and oxidising silicon compounds in the vapour state, such as $SiH_4$, $SiCl_4$ or $HSiCl_3$ with dry hydrogen or in a hydrocarbon flame.

The present invention aims to provide improved processes for the production of ultra fine sub micron silica particles.

Accordingly, the present invention provides a process for producing ultra fine silica particles, the process comprising directing a plasma jet onto a silicon-containing compound thereby to form silica vapour and condensing the silica vapour on a collection surface.

Embodiments of the present invention will now be described, by way of example only, with reference to the accompanying drawings, in which.

Figure 1:
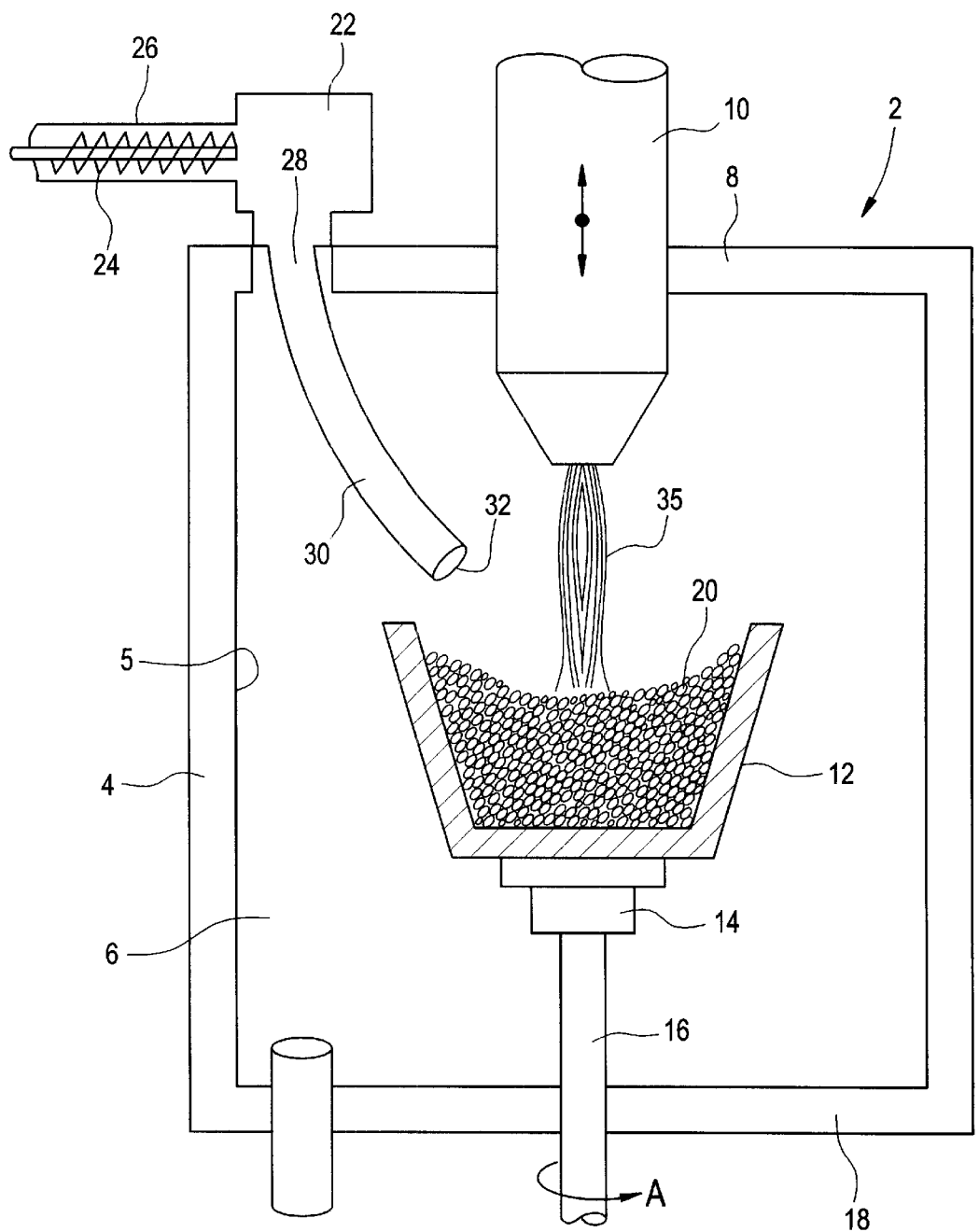
FIG. 1 is a schematic elevational view of an apparatus, incorporating a plasma torch, for producing ultra fine silica particles in accordance with a first embodiment of the present invention.

Referring to FIG. 1, there is shown a schematic diagram of a first apparatus for producing ultra fine silica particles in accordance with a first embodiment of the present invention.

The apparatus, designated generally as 2, comprises a sealed chamber 4 defining a cavity 6 therein. In a roof 8 of the chamber 4 is disposed a downwardly directed electrode 10, typically composed of graphite, of a plasma torch which can selectively be moved downwardly and upwardly respectively towards and away from a refractory vessel 12 disposed thereunder in the cavity 6. The refractory vessel 12 is supported on a support member 14 mounted on an upwardly directed shaft 16 extending through a bottom wall 18 of the chamber 4. The shaft 16 is rotatable about its axis as shown by the arrow A in FIG. 1.

In use, the refractory vessel 12 is filled with silica grains 20 of relatively large size, typically a diameter of from around 2 to 10 mm, which have typically been obtained by mechanical crushing of quartz crystals having a very high purity derived from rock fragments. A silica grain feed device 22 is provided in the roof 8 of the chamber 4. The feed device 22 includes a helical screw conveyor shaft 24 rotatably mounted within a conveyor tube 26 which communicates with a source of silica crystals (not shown). The conveyor shaft 24 feeds silica grains to an upper end 28 of a downwardly directed chute 30 which has a bottom end 32 located above the refractory vessel 12. When it is desired to introduce silica grains into the refractory vessel 12, the feed device 22 is operated so that a required amount of silica grains drops downwardly into the refractory vessel 12 via the chute 30 to form a body of silica grains to be vaporised.

In this embodiment of the production process for the ultra fine silica particles, the silica grains 20 in the refractory vessel 12 are evaporated at temperatures greater than 2000 degrees Centigrade by direct contact with a carrier gas plasma at very high temperature by operation of the plasma-arc torch functioning with an internal arc or with an external transferred arc.

Figure 2:
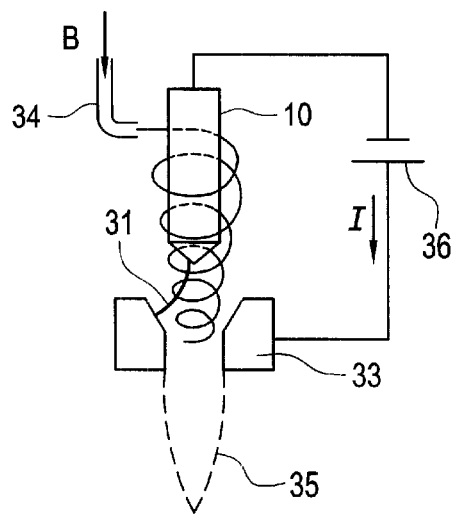
FIG. 2 is a schematic diagram showing the electrical circuitry for operating the plasma torch of FIG. 1.

In the embodiment of FIG. 1, an internal arc is employed. An inert gas to form the plasma, typically argon or helium, is fed downwardly past the electrode 10 which is connected to a source of electrical power and constitutes a first upper electrode of the plasma torch. The second electrode (not shown in FIG. 1) is located above the refractory vessel 12 and is connected electrically to the source of electrical power. FIG. 2 is an electrical circuit diagram of the apparatus of FIG. 1. It may be seen that for the internal arc plasma torch process, a current is established between the first electrode 10 and the second annular electrode 33 thereunder, with stabilising plasma-forming inert gas being fed along arrow B into a feed tube 34 which causes the stabilising gas emitted therefrom to be conveyed in a downwardly-directed helical fashion from the electrode 10 towards the silica grains 20 to be evaporated. An arc 31 in created between the electrodes 10,33 which generates a plasma from the inert gas. The plasma is directed downwardly through the annular second electrode 33 as a jet 35 which impacts the silica grains 20. The second electrode 33 is preferably composed of graphite. The source of electrical power is represented in FIG. 2 by a battery 36.

The intensity of the current between the two electrodes is preferably from 400 to 800 amps and the voltage between the electrodes is preferably from 40 to 50 volts. The plasma gas, preferably helium, is preferably fed at a rate of from 10 to 25 liters per minute. The plasma jet issuing from the electrode 10 functions with an internal arc between the electrodes 10,33 and is directed on the mass of molten silica on the surface of the silica grains in the refractory vessel 12. The silica evaporates and the silica vapour condenses on the inner surface 5 of the walls, which are preferably chilled, of the chamber 4. Periodically, the condensed silica particles which have an ultra fine sub micron range, are recovered from the inner surfaces 5 of the walls of the chamber 4 which act as silica collection surfaces. During the evaporation the refractory vessel 12 may be rotated by the shaft 16.

The apparatus of FIG. 1 provides a simple process for the production of ultra fine silica particles. However, the evaporation of the silica is relatively slow, limited to a few tens of grams per hour with an electrical power consumption of many tens of kilowatt hours per kilo of silica product.

Figure 3:
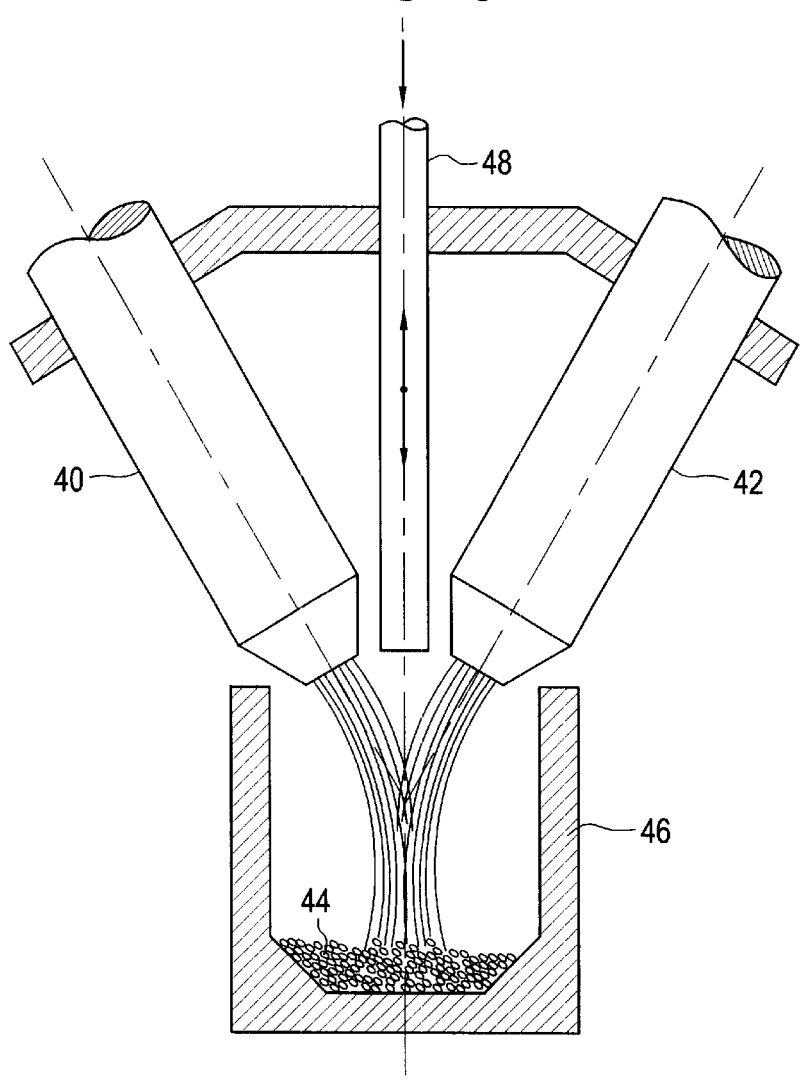
FIG. 3 is a schematic elevational view of a modification of the apparatus of FIG. 1 employing two plasma torches rather than one plasma torch.

FIG. 3 shows a modification of the apparatus of FIGS. 1 and 2 in which a pair of plasma torches is provided, constituted by a pair of generally downwardly-directed but relatively inclined upper electrodes 40,42 which are configured to direct a jet of plasma onto a mass of silica 44 in the refractory vessel 46. In this arrangement, the stabilising inert gas of argon or helium fed downwardly through a tube 48, which may be moved vertically as required, so as to output the stabilising gas in the vicinity of and between the two electrodes 42,44. The second electrode or electrodes, corresponding to electrode 33 of FIG. 1, is or are not shown.

Figure 4:
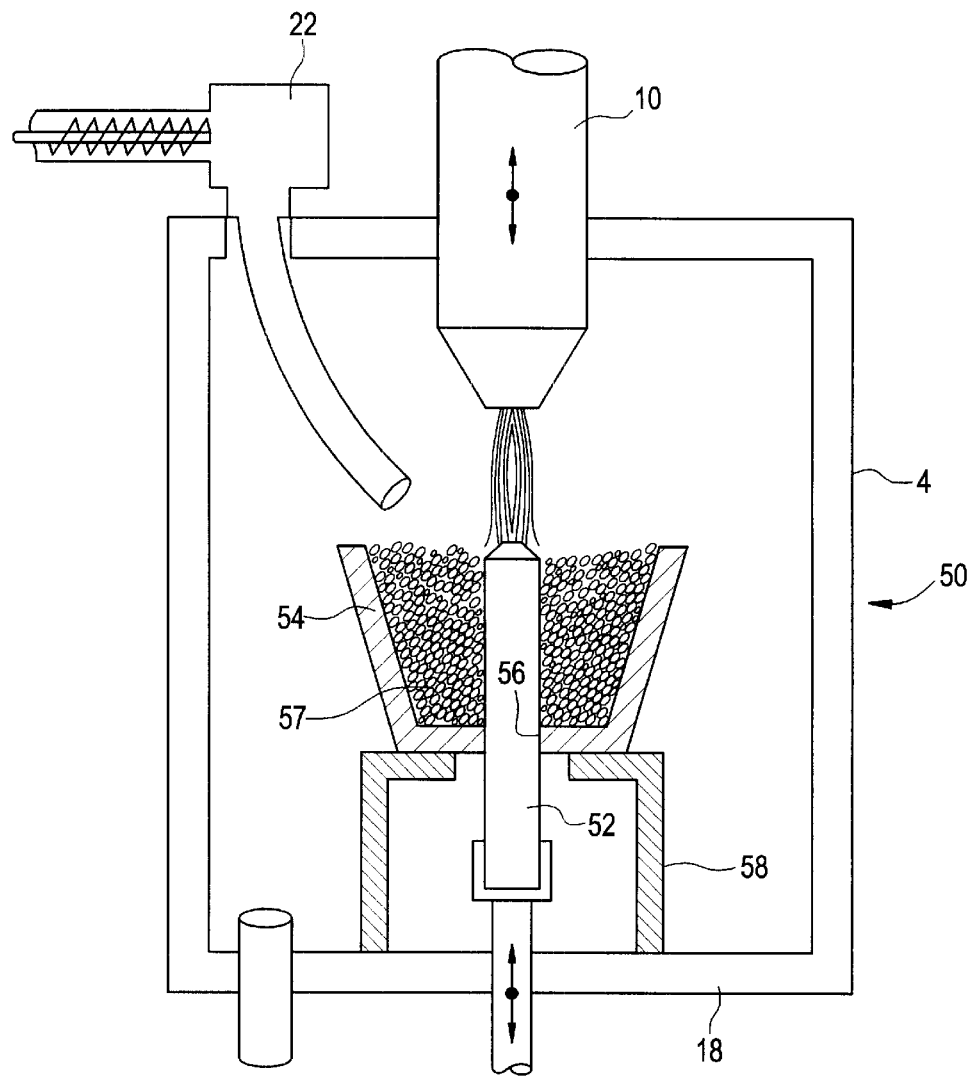
FIG. 4 is a schematic elevational view, similar to that of FIG. 1, showing a second embodiment of an apparatus, incorporating a plasma torch, for producing ultra fine silica particles in accordance with the present invention.

FIG. 4 is a schematic elevational view similar to that of FIG. 1 showing a second apparatus, designated generally as 50, for producing ultra fine silica particles in accordance with a further embodiment of the present invention. In this apparatus, the chamber 4, electrode 10 and silica feed device 22 are the same as for the apparatus of FIG. 1. However, the apparatus is modified by the provision of a third electrode 52 extending upwardly through the refractory vessel 54 which is provided with a central hole 56 therethrough whereby the third electrode 52 can extend upwardly through the silica grains 57 disposed in the refractory vessel 54. The third electrode 52 can be selectively moved upwardly and downwardly. The third electrode 52 is preferably composed of graphite. The refractory vessel 54 is located on a support 58 therefor which is disposed on the bottom wall 18 of the chamber 4.

Figure 5:
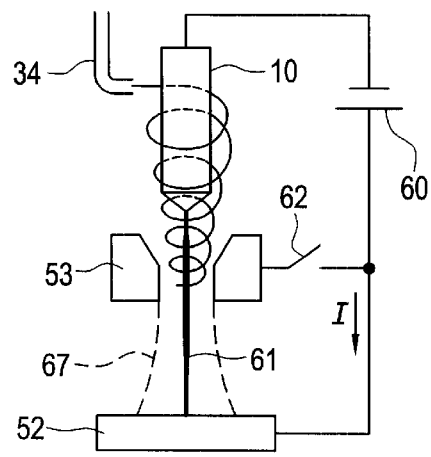
FIG. 5 is a schematic electrical circuit diagram showing a first mode of operating the plasma torch of FIG. 4 using an external transferred arc.
Figure 6:
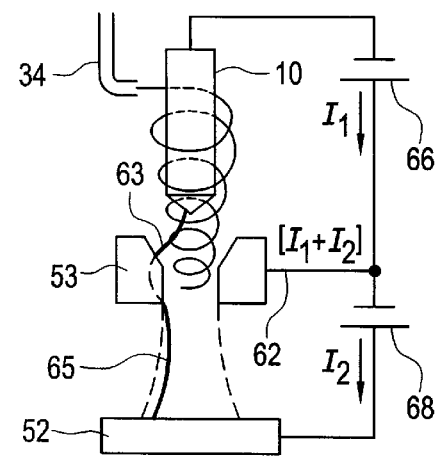
FIG. 6 is a schematic electrical circuit diagram of a second mode of operating the plasma torch of FIG. 4 using an internal arc together with a superimposed external arc.

As illustrated with respect to FIGS. 5 and 6, the apparatus of FIG. 4 can be operated either with an external transferred arc, wherein an arc 61 is established between the upper electrode 10 and the third electrode 52 as shown in FIG. 5, or with an internal arc 63 established between the electrode 10 and the second electrode 53 having the same structure and location as for the second electrode of the embodiment of FIGS. 1 and 2, in combination with a superimposed external arc 65 between the second electrode 53 and the third electrode 52 as shown in FIG. 6.

As is shown in FIG. 5 which illustrates the utilisation of an external transferred arc 61, a current from a source of electrical power constituted by the battery 60 is permitted to pass between the third electrode 52 and the upper electrode 10 and any electrical connection in the circuit to the second electrode 53 is left open by means of a switch 62. By providing an external transferred arc 61 between the two electrodes 10,52, the power supply to the external arc can be reduced as compared to that required by an internal arc. Thus the external transferred arc can be employed at a current of up to 500 amps and at a voltage of from 20 to 30 volts. This strongly reduces the consumption of the anode electrode of the plasma torch. The arc 61 causes a plasma jet 67 to be formed for evaporating the silica grains 57.

With respect to FIG. 6, the apparatus of FIG. 4 may be operated with an internal arc 63 and a superimposed external arc 65 to the third electrode 52. In this case, a first source of electrical power represented by battery 66 provides a first current $I_1$, between the second electrode 53 and the upper electrode 10. A second source of electrical power designated by the battery 68 provides a second current $I_2$ between the third electrode 52 and the second electrode 53. The switch 62 is closed. The first current $I_1$, creates an internal arc 63 between the electrode 10 and the second electrode 53. The second current $I_2$ provides a superimposed external arc 65 between the second electrode 53 and the third electrode 52. By using a superimposed external arc 65, the current of the internal arc 63 as employed in FIG. 1 can be reduced to 400 amps, at a voltage of 50 volts with helium gas and a voltage of 30 volts with argon gas, which again strongly reduces the consumption of the anode electrode of the plasma torch. The use of an external transferred arc provides a number of advantages. First, it reduces the consumption of the plasma torch electrodes. Second, the arc stability is greatly improved. Third, an intense heating of the silica around the third electrode immersed in the silica is achieved. In both cases, by using an external transferred arc or an external superimposed arc, the consumption of electrical energy is notably less compared to the use of an internal arc for the evaporation of any given amount of silica in terms of kilos per hour.

Figure 7:
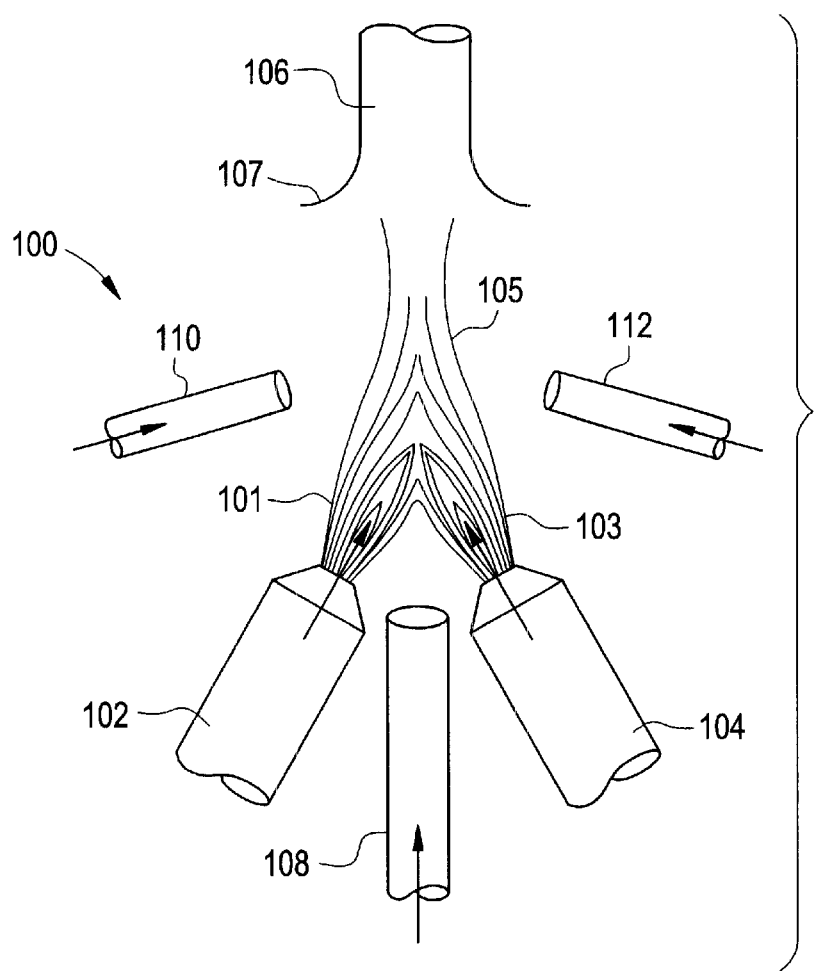
FIG. 7 is a schematic plan view of an apparatus incorporating two plasma torches for producing ultra fine silica particles in accordance with a third embodiment of the present invention.

Referring to FIG. 7, there is shown a schematic diagram of an apparatus for producing ultra fine silica particles in accordance with a further embodiment of the invention. In this embodiment, the silicon-containing starting material for producing the silica comprises a silicon-containing liquid, such as a silicon halide, for example silicon tetrachloride which has been obtained by chlorination of silica sand in the presence of carbon at a temperature of around 500 degrees Centigrade. The silica is produced from the silicon liquid by oxygenation. In particular, in this embodiment the silica is produced by reacting the silicon tetrachloride with oxygen heated to temperatures greater than 1300 degrees Centigrade by the plasma arc.

Referring to FIG. 7, there is provided in the apparatus 100 a pair of relatively inclined plasma torch electrodes 102,104 which are horizontally oriented and directed towards the axis of a receiving tuyere 106, which is typically cooled, for example with water. The tuyere 106 is preferably of metal typically Hastalloy C. The tuyere 106 has a flaring throat portion 107. The tuyere 106 acts as a silica collection surface. Each of the electrodes 102,104 is fed with an inert gas to form a plasma, for example argon or helium. A feed tube 108 for oxygen is axially aligned with the tuyere 106 and is located between the plasma torch electrodes 102,104. The tube 108 is arranged to direct a flow of oxygen gas into the plasma jets 101,103 generated by the two electrodes 102,104. The tube 108 is typically comprised of silica glass. A pair of secondary feed tubes 110,112 are located downstream of the electrodes 102,104 and are arranged to introduce on opposed sides of a common plasma jet 105 formed from the two plasma jets 101,103 from the two electrodes 102,104 a mixture of the silicon halide, typically silicon tetrachloride, with an inert gas, typically argon. The secondary tubes 110,112 are in an opposed orientation and each inclined to the axis extending between the tube 108 and the tuyere 106. Typically, each secondary tube 110,112 is composed of silica glass.

Figure 8:
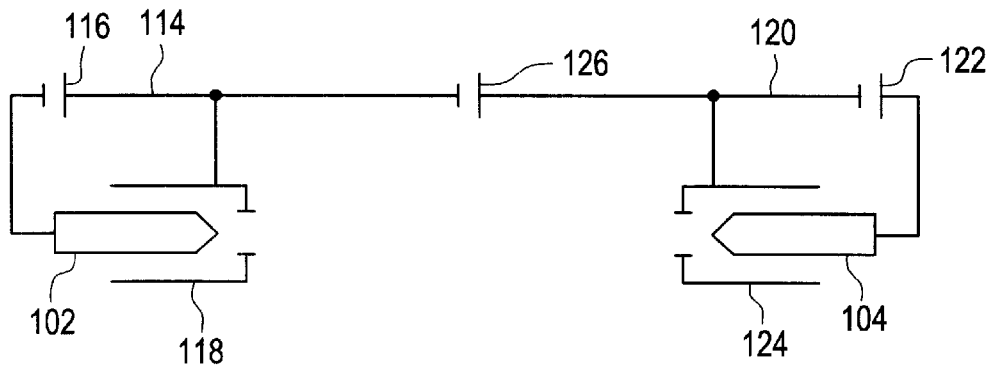
FIG. 8 is a schematic electrical circuit diagram for operating the two plasma torches of FIG. 7.

FIG. 8 shows an electrical circuit diagram for operating the apparatus of FIG. 7. The first electrode 102 constitutes an internal electrode of a first electrical circuit 114 which includes a first source of electrical power designated by a battery 116. The electrode 102 is spaced from a first frontal electrode 118, not shown in FIG. 7. In a second electrical circuit 120, the electrode 104 acts as an internal electrode and is connected to a source of electrical power, designated by the battery 122, and is spaced from and opposes a second frontal electrode 124 also connected to the source of electrical power 122. The second frontal electrode 124 is not shown in FIG. 7. The two electrical circuits are connected together by a third source of electrical power designated by battery 126.

In operation., oxygen gas is fed, typically at a rate of around 50 liters per minute, into the plasma arc 101,103,105 established downstream of the electrodes 102,104. This heats the oxygen to very high temperatures, typically greater than 1300 degrees Centigrade, and into the heated oxygen is injected the silicon chloride gas in the inert gas, typically at a temperature of around 200 degrees centigrade. The silicon chloride is oxidised to form very fine silica particles by condensation on the surface of the tuyere 106.

This process has a high production rate of silica which may be around 4 kilograms per hour or greater. The internal arc of the two torches typically has a current of from 400 to 500 amps and an external arc may be superposed at a current of up to about 250 amps. The voltage is typically from 70 to 80 volts. The power of the plasma arcs is typically on the order of around 50 kilowatts.

Figure 9:
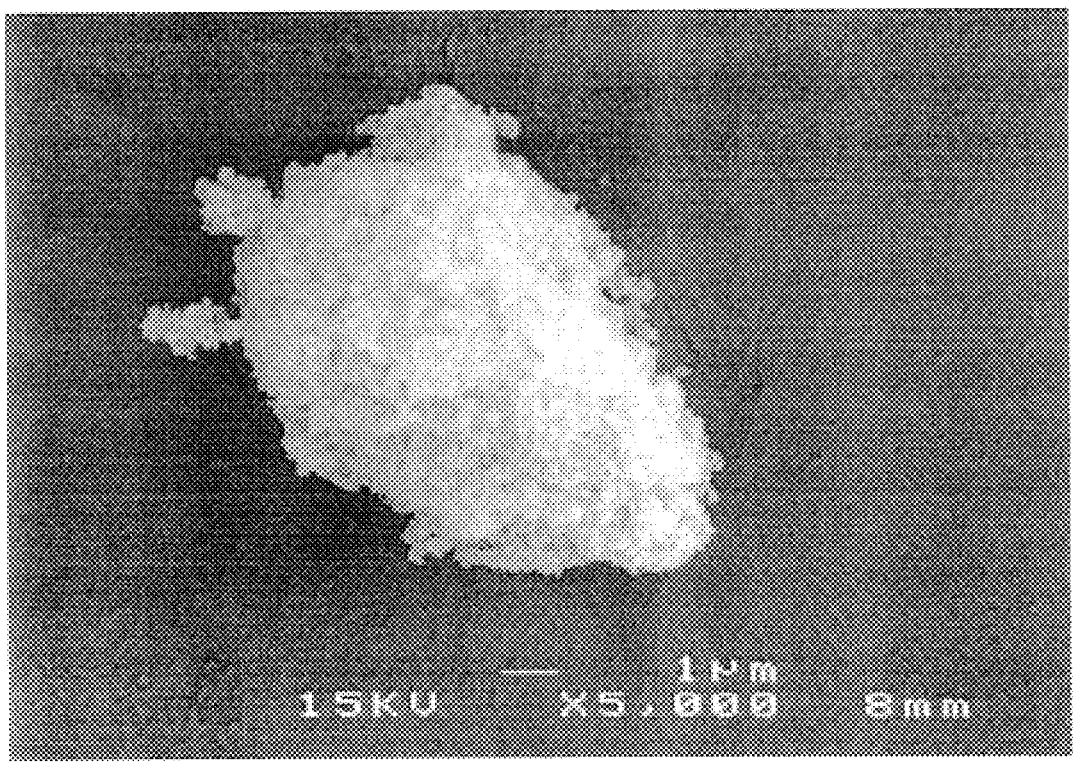
FIG. 9 is a scanning electron micrograph of agglomerated ultra fine silica particles produced in accordance with the invention.

The present invention can thus provide very fine sub micron silica particles having a diameter of less than 1 micron. FIG. 9 is a scanning electron micrograph showing that by using the process of the present invention, the sub micron silica particles are agglomerated into silica particles having diameters of a few microns. Typically, the agglomerated silica particles have a pore volume of around 0.56 cc/g and a surface area of 126 $m^2$/g.

The silica particles produced in accordance with the invention, having high porosity and surface area, may be used as catalyst supports or as anti-blocking or anti-slipping agents in plastics films, for example polyethylene films.

In the production of catalyst supports, the silica particles produced in accordance with the invention may be agglomerated still further with other silica particles having quite different porosity and surface area characteristics in order to form bimodal or multimodal porosity distribution silica. Techniques for agglomeration of silica particles are known in the art. The final catalyst support may be either impregnated with a chromium compound solution in order to deposit chromium thereon in order to produce a chromium based catalyst for ethylene polymerisation, or reacted with a source of magnesium and titanium to produce a Ziegler-Natta type catalyst, or reacted with a metal alkyl to produce a multiple oxide support. The metal alkyl may include methyl aluminoxane, isobutyl aluminoxane or propyl aluminoxane for example. The use of such an aluminoxane may produce an appropriate support to deposit metallocenic structures thereon to produce a single site type catalyst.

What is claimed is:

1. A process for producing ultra fine silica particles, the process comprising:
    a) directing a plasma jet formed from an inert gas onto a body of grains of silica wherein the jet is formed using a first electrode and a second electrode thereby to form silica vapour, and
    b) condensing the silica vapour on a collection surface, wherein said first and second electrodes are located above the grains of silica, wherein said second electrode is annular and located under the first electrode, and wherein said inert gas is fed helically downwardly from said first electrode through said second electrode towards the body of grains of silica to be evaporated.

2. A process according to claim 1 wherein the grains of silica have a diameter of from 2 to 10 mm.

3. A process according to claim 1, wherein the plasma jet is formed using an internal arc.

4. A process according to claim 3 wherein the internal arc is created by a current of from 400 to 800 amps at a voltage of from 40 to 50 volts.

5. A process according to claim 1 wherein the gas is fed at a rate of from 10 to 25 liters per minute.

6. A process according to claim 1 wherein the plasma jet is at least partially formed using an external arc created between the first electrode and a third electrode located in the body of grains of silica.

7. A process according to claim 6 wherein the external arc is formed at a current of up to 500 amps and a voltage of from 20 to 30 volts.

8. A process according to claim 6 wherein the plasma jet is formed using said external arc in combination with an internal arc, wherein said internal arc is formed between the first electrode and the second electrode.

9. A process according to claim 8 wherein the internal arc has a current of up to 400 amps at a voltage of from 30 to 50 volts.

* * * * *